US012786281B2

(12) United States Patent
Nandy et al.

(10) Patent No.: US 12,786,281 B2
(45) Date of Patent: Nov. 3, 2026

(54) APPLICATION POLICIES FOR SERVICE DISCOVERY

(71) Applicant: HEWLETT PACKARD ENTERPRISE DEVELOPMENT LP, Spring, TX (US)

(72) Inventors: Tathagata Nandy, Bangalore (IN); Renjith Vijayan, Bangalore (IN); Vijeesh Erankotte Panayamthatta, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 19/020,164

(22) Filed: Jan. 14, 2025

(65) Prior Publication Data

US 2026/0113383 A1 Apr. 23, 2026

(30) Foreign Application Priority Data

Oct. 17, 2024 (IN) ............................ 202441078985

(51) Int. Cl.
*H04L 67/51* (2022.01)
*H04L 12/18* (2006.01)

(52) U.S. Cl.
CPC ............. *H04L 67/51* (2022.05); *H04L 12/18* (2013.01); *H04L 2212/00* (2013.01)

(58) Field of Classification Search
CPC ..... H04L 67/51; H04L 12/18; H04L 2212/00; H04L 69/00; H04L 69/02; H04L 69/03; H04L 69/04; H04L 69/08; H04L 69/16; H04L 69/18; H04L 69/22; H04L 69/24; H04L 69/30; H04L 69/32; H04L 69/40; H04L 12/16; H04L 12/28; H04L 12/44; H04L 12/46; G16Y 40/00; G16Y 40/10;
(Continued)

(56) References Cited

U.S. PATENT DOCUMENTS 7,921,194 B2 4/2011 Song et al.
8,891,513 B1 * 11/2014 Huang .................. H04L 49/253 370/352
11,228,531 B2 * 1/2022 Rekhate .................. H04L 45/16
(Continued)

OTHER PUBLICATIONS

Goland et al., "Simple Service Discovery Protocol/1.0", Oct. 28, 1999, Internet Enigneering Task Force, https://www.ietforg/archive/id/draft-cai-ssdp-v1-03.txt.*
(Continued)

*Primary Examiner* — Douglas B Blair
(74) *Attorney, Agent, or Firm* — Yao Legal Services, Inc.

(57) ABSTRACT

In a network, a network device can determine a service advertised by a server in the fields of a multicast data packet associated with a multicast group indicated by a Simple Service Discovery Protocol (SSDP). The network device can determine, based on a policy associated with the service, whether the first role of a client device is allowed to receive the service. The client device can be coupled to the network device via a first port. If the first role is allowed to receive the service, the network device can forward the first multicast data packet to the client device via the first port. If the first role is not allowed to receive the service, the network device can block the first multicast data packet at the first port to prevent advertisement of the service to the client device.

20 Claims, 11 Drawing Sheets

(58) Field of Classification Search
CPC ........ G16Y 40/20; G16Y 40/30; G16Y 40/35; G16Y 40/40
See application file for complete search history.

(56) References Cited

U.S. PATENT DOCUMENTS

| | | | | | |
|---|---|---|---|---|---|
| 11,799,929 | B1 | 10/2023 | Nandy et al. | | |
| 2009/0086689 | A1* | 4/2009 | Hunt | H04W 28/06 | 370/338 |
| 2013/0064247 | A1* | 3/2013 | Song | H04L 12/4675 | 370/392 |
| 2022/0182359 | A1* | 6/2022 | Devaraj | H04L 63/0876 | |
| 2023/0069306 | A1* | 3/2023 | Majila | H04L 45/16 | |
| 2023/0246946 | A1* | 8/2023 | Lee | H04L 65/80 | 709/238 |

OTHER PUBLICATIONS

"IP Multicast, IGMP Cofniguration Guide", Feb. 8, 2013, Cisco Systems, https://www.cisco.com/c/en/us/td/docs/ios-xml/ios/ipmulti_igmp/configuration/xe-16/imc-igmp-xe-16-book.pdf.*

* cited by examiner

APPLICATION POLICIES FOR SERVICE DISCOVERY

BACKGROUND

A network device, such as a switch, may support different network technologies, such as service discovery. For example, the network device can support Simple Service Discovery Protocol (SSDP), which uses multicast to discover services provided in a network.

BRIEF DESCRIPTION OF THE FIGURES

In the figures, like reference numerals refer to the same figure elements.

DETAILED DESCRIPTION

Figure 1A:
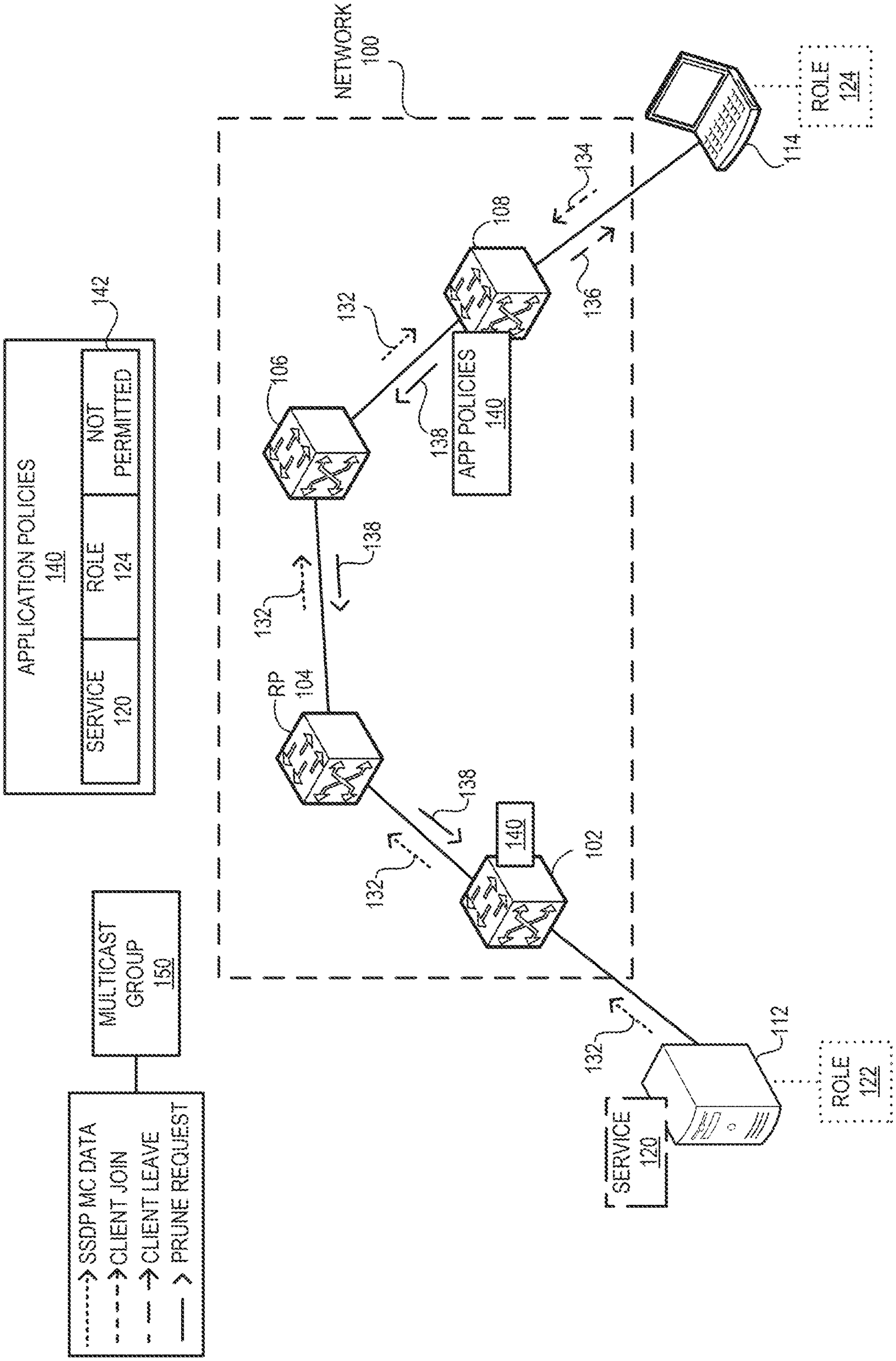
FIG. 1A illustrates an example of a client-connected network device applying application policies for service discovery, in accordance with an aspect of the present application.

The volume of traffic generated by various applications on user devices continues to increase. To efficiently forward and manage the traffic in a network, the network devices can be equipped with versatile capabilities, such as role-based traffic segmentation (RBTS). Since the devices with the same roles form a device group, RBTS can also be referred to as group-based traffic segmentation (GBTS). Typically, when a client device is coupled to a network, the client device can become associated with a role, which corresponds to a set of privileges allocated to the client device. A set of application policies can indicate which role is allowed to receive a particular service.

For example, in an enterprise network, a client device in the engineering group can be associated with an "engineer" role. Consequently, the client device can gain access to services offered to an engineer (e.g., a distributed coding environment). Similarly, the client device may not access services that are not relevant to an engineer (e.g., the accounting system). If a network device supports traffic segmentation, a packet from the client device can be delivered to a server associated with the distributed coding environment but may not be delivered to another server associated with the accounting system. Here, a server can be a device that offers a service, such as the distributed coding environment or accounting system. A client device can be a device that requests or solicits a service. Therefore, if a client device is not allowed to receive the packet, the network device coupled to the client device can refrain from forwarding the packet to the destination device and may drop the packet. In this way, traffic segmentation can separate network traffic based on roles.

The user devices coupled to the network may support Universal Plug and Play (UPnP) to facilitate automatic service discovery. UPnP is a service-discovery capability provided based on the Simple Service Discovery Protocol (SSDP). When a user device supports SSDP, an SSDP instance can run on the user devices, such as servers and client devices. If a server provides a service (e.g., printing, media storage, streaming, etc.), the SSDP instance on the server can periodically send advertisement packets, which are multicast packets to a multicast address reserved for SSDP (e.g., multicast Internet Protocol (IP) address 239.255.255.250) to advertise the service. The fields of the advertisement packets can indicate the service provided by the server. The server providing the service can be referred to as a service source or provider.

A client device requesting the service can be referred to as a service client. The client device may also solicit a service by periodically sending solicitation packets, which are multicast packets sent to the multicast address associated with SSDP. The solicitation and advertisement packets can facilitate the service discovery based on SSDP and, hence, be referred to as SSDP packets. The client device and the server may send client join requests (e.g., an Internet Group Management Protocol (IGMP) join) to their respective network devices. As a result, when an advertisement or solicitation packet is received at a network device, the packet can be forwarded to the device that has sent the IGMP join. In this way, the service advertisements and solicitations can reach their destinations.

The aspects described herein address the problem of applying traffic segmentation for service discovery by (i) performing an enhanced deep-packet inspection (DPI) on the fields of advertisement and solicitation packets to determine the service of the packets; and (ii) determining whether the role of a client device is allowed to receive the service based on an application policy. If the role is allowed to receive the service, the advertisement packet can be forwarded to the client device, and the solicitation packet can be forwarded to the server. In this way, a client device is precluded from discovering a service that it is not allowed to access.

Currently, to apply the application policies on a packet, a network device, such as a switch, can determine the service associated with the packet by performing DPI on the packet. The packet can be sent by a server (i.e., a device offering a service) to a client device (i.e., a device requesting or soliciting the service). The network device can determine the protocol and port information associated with the packet based on the DPI. The network device can then determine an application (e.g., such as "Facebook") and a corresponding service (such as "social media") based on the determined information. The network device can also determine the role of the client device. This role can be referred to as a client role. In some examples, the network device can maintain a mapping between an identifier of the client device (e.g., the media access control (MAC) address) and the corresponding client role. Based on the mapping, the network device can determine the role associated with a respective client device.

Upon determining the role and the service, the network device can look up the combination of the role and the service in a policy data structure, which stores the set of application policies. The policy data structure can be stored in the forwarding hardware (e.g., Ternary content-addressable memory (TCAM)) of a network device. If the lookup finds a match, the network device can obtain the application policy corresponding to the match and determine whether the role is allowed to receive the service. If the role is allowed to receive the service, the network device can forward the packet. Otherwise, the network device may drop the packet. In this way, the network device can apply an application policy based on the role associated with the packet.

However, to send the packet, the server may need to determine that the client device is soliciting the service. Furthermore, to solicit the service, the client device may need to identify the server providing the service. The network can use SSDP to discover services offered via the network. The servers and the client devices can exchange multicast packets of a predetermined multicast group to share service information. There can be a rendezvous point (RP) associated with the multicast group. The RP can be one of the network devices participating in the multicast group. The servers and the client devices can be preconfigured with the information (e.g., IP address) of the RP.

The network devices coupling the servers, which can be referred to as server-side network devices, can register with the RP for receiving solicitation packets in accordance with a multicast protocol, such as Protocol-Independent Multicast (PIM). Similarly, the network devices coupling the client devices, which can be referred to as client-side network devices, can register with the RP for receiving advertisement packets. When the servers send the advertisement packets, the server-side network device can forward the advertisement packets to the RP, which can then forward them to the client-side network devices. Upon receiving an advertisement packet, a client-side network device can determine the source address of the server and can communicate over the shortest path to the server, in accordance with the multicast protocol.

Similarly, when the client devices send the solicitation packets, the client-side network devices can forward the solicitation packets to the RP, which can then forward them to the server-side network devices. A server-side network device can also communicate over the shortest path with a corresponding client device based on the multicast protocol.

However, when the DPI is performed on the advertisement and solicitation packets to identify the associated service, the DPI may identify the service discovery as the service from these packets. In other words, the DPI may identify SSDP or UPnP as the service associated with these packets. Consequently, the DPI may not be able to identify the actual services being advertised or solicited. As a result, a client device may discover services that is not allowed to receive. Similarly, a server may advertise its service to a client device that it is not allowed to receive the service.

To address this issue, upon identifying an SSDP packet (i.e., a solicitation or advertisement packet), a network device can perform an enhanced DPI, which includes inspecting a set of predetermined fields of the packet, to determine the service advertised by the packet. The network device can identify the packet as an SSDP packet based on the destination IP address of the packet because the SSDP packets are sent to a predetermined multicast address (e.g., multicast IP address 239.255.255.250). When a packet is identified as an SSDP packet, the network device can determine the associated service by performing enhanced DPI on the SSDP fields of the packet. These fields can include, but are not limited to, a server type, a unique service name (USN) (e.g., a unique device identifier, such as a Universal Unique Identifier (UUID)), and a device location.

To perform enhanced DPI on the packet, the network device can inspect the information in the fields of the packet and determine one or more service indicators indicating which service these fields correspond to. Suppose that a server advertises a printing service that allows a client device to print a document. The server type field of an SSDP packet can identify the server as a network printer or a print server. The USN field can include a UUID string that may include the phrase "print" or "printer." Here, the service indicators in these fields can jointly indicate a printing service. Therefore, by inspecting these fields, the network device can determine that the advertisement packet is advertising a printing service. In this way, the enhanced DPI can allow the network device to identify the service associated with an SSDP packet.

When a server sends the advertisement packet, the packet is forwarded to the RP of the multicast group associated with SSDP. Since a respective client device running an SSDP instance can register with the RP, the RP can forward the packet to the client device. The client-side network device can receive the packet and perform enhanced DPI on the packet. By inspecting the fields of the packet, the client-side network device can determine the service advertised in the packet. The client-side network device can receive an IGMP join request for the multicast group from a respective client device and, hence, can determine which client devices are awaiting service advertisements.

The client-side network device can further determine the role of a respective client device awaiting service advertisements and compare the service with the application policy to determine whether the role is allowed to receive the service. For example, the application policy can indicate that a "guest" client role is not allowed to access the printing service. If the role is not allowed to receive the service, the client-side network device can block the packet at the port coupled to the client device. Here, the network device can refrain from forwarding the packet to the client device and may drop the packet. In other words, the network device does not forward the packet to the client device and prevents the service from being advertised to the client device. In this way, the client-side network device can apply the application policy on the service advertisement. The application policy can be applied for a respective client device awaiting service advertisements. If none of these client devices is allowed to receive the service, the client-side network device can send a "prune" request (e.g., a PIM prune request) to the server-side network device. Based on the prune request, the server-side network can stop sending the advertisement packets associated with the service to the client-side network device.

To trigger the prune request, the client-side network device can generate a client leave request (e.g., an IGMP leave) for a respective client device that has previously sent a join request and send the leave request to a local interface (i.e., to itself). For example, the leave request can be sent to the "localhost" interface of the client-side network device. Consequently, the PIM daemon of the client-side network device can determine that there is no client device awaiting multicast packets (i.e., the advertisement packets) of the multicast group associated with SSDP. Hence, the PIM daemon can generate the prune request and send it to the server-side network.

In some examples, the application policy may also indicate a server role. The application policy can then indicate whether a client role is allowed to receive a particular service from a server role. For example, the application policy can indicate that a "guest" client role is not allowed to access the printing service associated with an "engineer" server role but is allowed to access the printing service associated with a "guest" server role. The advertisement packets from a server can then include information indicating the server role. For example, a respective role defined in the network can correspond to a unique identifier. The identifier of the server role can then be included in the advertisement packets. Upon receiving an advertisement, the client-side network device can determine whether a client role is allowed to receive the service from the server role. If the client role is not allowed to receive the service from the server role, the client-side network device does not forward the packet to the client device and prevents the service from being advertised to the client device.

In some examples, when the server-side network device receives an advertisement packet from a server, the server-side network device can encapsulate the advertisement packet with an encapsulation header (e.g., a tunnel encapsulation header, such as a Virtual Extensible LAN (VXLAN) header). The server-side network device can include the information indicating the server role in the encapsulation header and send the encapsulated advertisement packet to the client-side network device. The client-side network device can receive the encapsulated advertisement packet and determine the server role from the encapsulation header. The client-side network device can then decapsulate the encapsulation header to obtain the advertisement packet and determine the service by performing enhanced DPI on the advertisement packet.

In the reverse direction, a client device seeking a particular service can send a solicitation packet for the service. When the client-side network device receives the solicitation packet, the client-side network device can include information indicating the client role. In some examples, the client-side network device can encapsulate the solicitation packet and include the information in the encapsulation header. The client-side network device can then send the solicitation packet to the server-side network device via the RP. The server-side network device can receive the packet and determine the client role (e.g., from the encapsulation header). The server-side network device can then decapsulate the encapsulation header, obtain the solicitation packet, and perform enhanced DPI on the solicitation packet to determine the service solicited by the packet. Subsequently, the server-side network device can determine whether the client role is allowed to receive the service. If the client role is not allowed to receive the service, the server-side network device can block the packet at the port coupled to the server. Here, the server-side network device can refrain from forwarding the solicitation packet via the port to the server and may drop the solicitation packet. In other words, the network device does not forward the solicitation packet to the server. Consequently, the server does not send packets associated with the service to the client device.

If the server-side network device does not receive service solicitation from any other client device that is allowed to receive the service, the server-side network device can send a prune request (e.g., a PIM prune request) to the client-side network device. Based on the prune request, the client-side network device can stop sending the solicitation packets associated with the service to the server-side network device. To trigger the prune request, the network device can generate an IGMP leave request for the server and send the IGMP leave request to a local interface (i.e., to itself). For example, the IGMP leave request can be sent to the "localhost" interface of the server-side network device. Consequently, the PIM daemon of the server-side network device can determine that there is no device awaiting multicast packets (i.e., the solicitation packets) of the multicast group associated with SSDP. Hence, the PIM daemon can generate the prune request and send it to the client-side network device.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to an endpoint of a link that can receive or transmit data. "Port" can also refer to the hardware, software, and/or firmware logic that can facilitate the operations of that port.

FIG. 1A illustrates an example of a client-connected network device applying application policies for service discovery, in accordance with an aspect of the present application. A network 100 can include a number of network devices (e.g., switches), and may include network devices, such as layer-2 and layer-3 hops, and tunnels. In some examples, network 100 can be an Ethernet network, InfiniBand network, or other network, and may use a corresponding communication protocol, such as IP, FibreChannel over Ethernet (FCoE), or other protocols. Network 100 can include network devices 102, 104, 106, and 108. These network devices can be individual physical network devices or networking units (e.g., switching units, such as switch blades) within a chassis. A respective network device in network 100 can be assigned a MAC address and an IP address and can include at least one processing resource. Examples of a processing resource can include, but are not limited to, a processor core, a graphics processing unit (GPU), and a tensor processing unit (TPU). The network device can also include at least one non-transitory computer-readable medium storing instructions that, when executed by the processing resource, causes the processing resource to perform one or more operations. The network device can further include forwarding hardware (e.g., the ASIC of the network device, which can at least incorporate a TCAM).

To efficiently forward and manage the traffic in network 100, network devices 102, 104, 106, and 108 can facilitate role-based or group-based traffic segmentation. Typically, when user devices 112 and 114 become coupled to network 100, user devices 112 and 114 can become associated with corresponding roles 122 and 124, respectively. User devices 112 and 114 can be coupled to network devices 102 and 108, respectively, via corresponding ports. Here, user device 112 can be a server that can facilitate a service 120. User device 114 can run an application using which service 120 can be accessible. Therefore, user device 112 can be referred to as server 112, and user device 114 can be referred to as client device 114. For example, if service 120 is printing, server 112 can be a print server, and client device 114 can use a printer driver to access service 120.

A set of application policies 140 can be deployed on network 100 to indicate which client role is allowed to receive a particular service. A respective access network device of network 100 can store application policies 140 and apply them on packets. An access network device in network 100 is a network device that can couple a user device and forward packets from the user device via network 100. In this example, network 100 can include access network devices 102 and 108. Hence, network devices 102 and 108 can store application policies 140 in respective policy data structures. The policy data structure can be stored in the forwarding hardware (e.g., in the TCAM) of a network device. When a packet is received by network device 102 or 108, it can determine a service associated with the packet, if any, and determine whether the role associated with the destination address of the packet is allowed to receive the service.

For example, if role 124 is an “engineer” role, client device 114 can gain access to services offered to an engineer. Client device 114 may not access services that are not relevant to an engineer, such as an accounting system. If service 120 is a printing service that role 124 is allowed to receive, network device 102 can forward a packet comprising a print request from client device 114 to server 112. On the other hand, if service 120 is an accounts management service that role 124 is not allowed to receive, network device 102 does not forward a packet soliciting the accounts management service from client device 114 to server 112 and may drop the packet. Here, network device 102 can block the packet from forwarding to server 112. In this way, traffic segmentation in network 100 can separate traffic associated with services based on roles.

If service 120 can automatically be discovered by client device 114, server 112 and client device 114 may support UPnP and SSDP. Therefore, respective SSDP instances can run on server 112 and client device 114. To advertise service 120, the SSDP instance on server 112 can periodically send advertisement packets, such as packet 132. Packet 132 can be a multicast packet destined to a multicast group 150 reserved for SSDP. For example, multicast group 150 can correspond to multicast IP address 239.255.255.250 associated with SSDP. The fields of packet 132 can indicate service 120 provided by server 112. Client device 114 can send a client join request 134 (e.g., an IGMP join) for multicast group 150 to network device 108. As a result, when packet 132 is received at network device 108, network device 108 can determine that client device 114 is awaiting multicast data packets of multicast group 150. Accordingly, network device 108 can forward packet 132 to client device 114.

To apply application policies 120 on packet 132, network device 108 can determine service 120 associated with packet 132 by performing DPI on packet 132. Network device 108 can maintain a mapping between an identifier of client device 114 (e.g., the MAC address of client device 114) and corresponding client role 124. Based on the mapping, network device 108 can determine role 124 associated with client device 124. Upon determining role 124 and service 120, network device 108 can look up the combination of role 124 and service 120 in the policy data structure. If the lookup finds a match (e.g., a TCAM match), network device 108 can obtain an application policy 142 corresponding to the match.

Based on application policy 142, network device 108 can determine whether role 124 is allowed to receive service 120. However, when network device 108 performs DPI on packet 132, the DPI may identify the service discovery as the service from packet 132. In other words, the DPI may identify SSDP or UPnP as the service associated with packet 132. Consequently, the DPI may not identify service 120 in packet 132. As a result, client device 114 may discover 120 that client device 114 is not allowed to receive. Similarly, server 112 may advertise service 120 to client device 114 even when client device 114 is not allowed to receive service 120.

To address this issue, when network device 108 receives packet 132, network device 108 can perform an enhanced DPI to determine service 120 from packet 132. Since packet 132 is associated with multicast group 150 (e.g., sent to multicast IP address 239.255.255.250), network device 108 can identify packet 132 as an SSDP packet. Network device 108 can then inspect a set of predetermined fields of packet 132 to perform enhanced DPI. These fields can include, but are not limited to, a server type, a USN, and a device location. Based on the information indicated in these fields, network device 108 can identify service 120.

For example, if server 112 is a printing server and service 120 is a printing service, the server type field of packet 132 can identify server 112 as a network printer or a print server. The USN field can include a UUID string that may include the phrase “print” or “printer.” By inspecting these fields, network device 108 can determine that packet 132 is advertising a printing service. In this way, the enhanced DPI can allow network device 108 to identify service 120 advertised by packet 132. Since client device 114 has sent join request 134 for multicast group 150, network device 108 can determine role 124 of client device 114 (e.g., based on the MAC address of client device 114). Network device 108 can then identify application policy 142 associated with service 120 and determine whether role 124 is allowed to receive service 120. If role 124 is not allowed to receive service 120, network device 108 can block packet 132 at the port coupled to client device 114. To do so, network device 108 can refrain from forwarding packet 132 to client device 114 and may drop packet 132. Hence, network device 108 does not forward packet 132 to client device 114 even though client device 114 has requested to receive traffic of multicast group 150. In this way, network device 108 can apply application policy 142 on packet 142 and prevent the advertisement of service 120 to client device 114.

Since client device 114 is not allowed to receive service 120, network device 108 can send a client leave request 136 (e.g., an IGMP leave) for multicast group 150 and send leave request 136 to a local interface (i.e., to itself). For example, leave request 136 can be sent to the "localhost" interface of network device 108. Since there are no other network devices awaiting multicast packets of multicast group 150, the PIM daemon of network device 108 can generate a prune request 138 and send prune request 138 to network device 102. The PIM daemon can be a software entity executing on a processing resource of network device 108. The PIM daemon can execute the PIM protocol on network device 108. Based on prune request 138, network device 102 can stop sending advertisement packets associated with service 120 to network device 108. As a result, network device 108 may no longer receive advertisement packets (e.g., subsequent packets of packet 132), which can reduce the utilization of network resources in network 100.

Figure 1B:
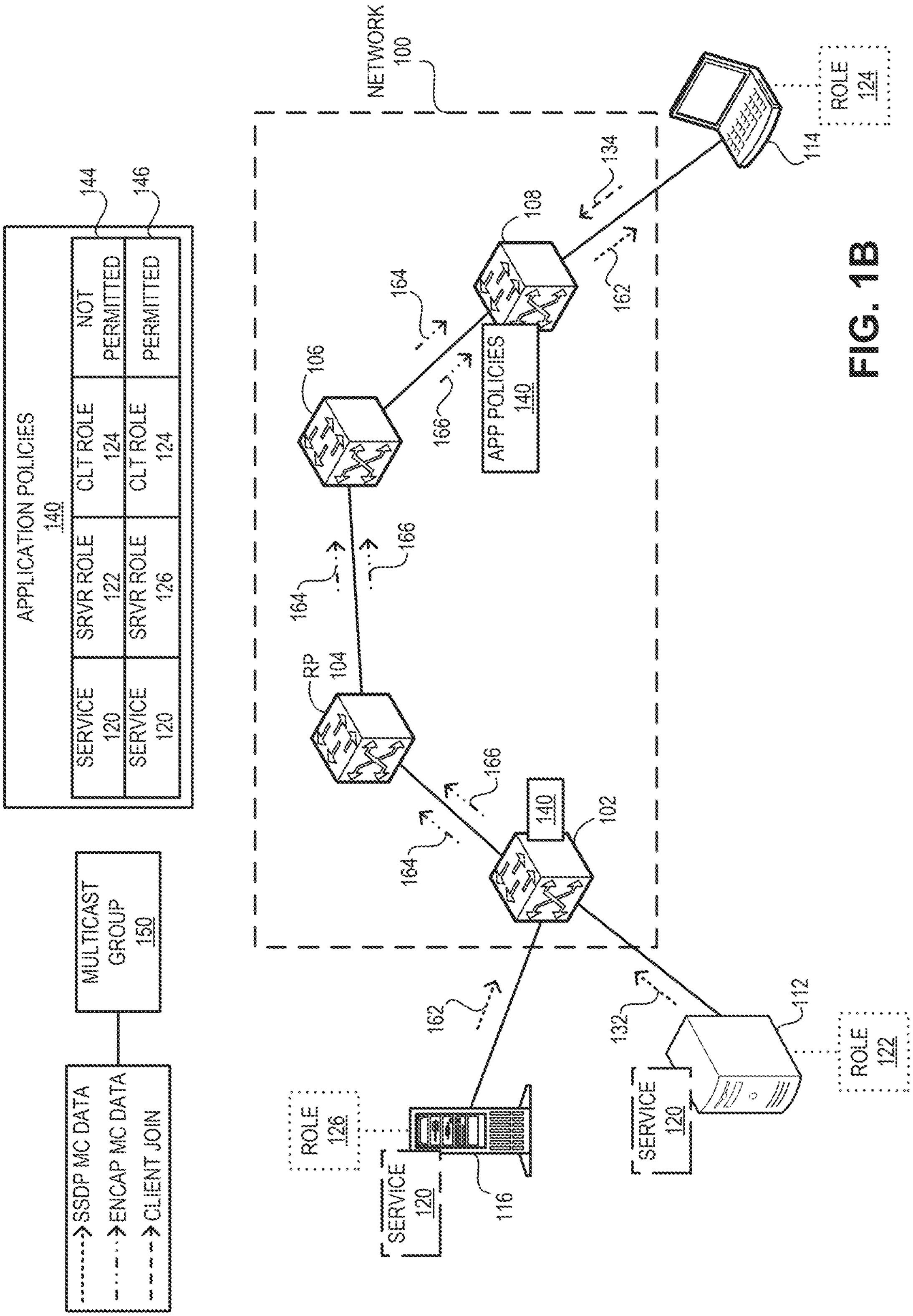
FIG. 1B illustrates an example of a client-connected network device applying application policies associated with server roles for service discovery, in accordance with an aspect of the present application.

FIG. 1B illustrates an example of a client-connected network device applying application policies associated with server roles for service discovery, in accordance with an aspect of the present application. Some application policies in application policies 140 may also indicate a server role. For example, application policy 144 can indicate that client role 124 is not allowed to receive service 120 from server role 122. Another application policy 146 can indicate that client role 124 is allowed to receive service 120 from server role 126. In this way, client role 124 can receive service 120 from server role 126 but not from server role 122. Suppose that another server 116 coupled to network device 102 provides service 120. Here, server 116 can be associated with role 126. Server 162 can then send an advertisement packet 162 associated with multicast group 150.

To distinguish between server roles 122 and 126, and determine whether a particular server role allows service 120 for client role 124, network device 108 can determine which advertisement packet corresponds to which server role. Hence, packets 132 and 162 can include information indicating server roles 122 and 126, respectively. For example, roles 122, 124, and 126 can correspond to respective unique identifiers. Accordingly, the identifiers of server roles 122 and 126 can be included in packets 132 and 162, respectively. When network device 102 receives packet 132 from server 112, network device 102 can encapsulate packet 132 with an encapsulation header (e.g., a tunnel encapsulation header, such as a VXLAN header) and generate encapsulated packet 164. Network device 102 can include the information indicating role 122 in the encapsulation header of packet 164 and send packet 164 to network device 108 via a tunnel between network devices 102 and 108 (e.g., a VXLAN tunnel). Similarly, upon receiving packet 162 from server 116, network device 102 can encapsulate packet 162 with an encapsulation header and generate encapsulated packet 166. Network device 102 can include the information indicating role 126 in the encapsulation header of packet 166 and send packet 166 to network device 108 via the tunnel between network devices 102 and 108.

Network device 108 can receive packet 164 and determine server role 122 from the encapsulation header. Network device 108 can then decapsulate the encapsulation header to obtain packet 132 and determine service 120 by performing enhanced DPI on packet 132. Network device 108 can determine that client device 114 is awaiting advertisements of service 120. Based on application policy 142, network device 108 can determine that client role 114, which is associated with client device 114, is not allowed to receive service 120 from server role 112. Therefore, network device 108 does not forward packet 132 to client device 114. By refraining from forwarding packet 132 to client device 114, network device 108 can prevent the advertisements of service 120 from server 112. Network device 108 can also receive packet 166 and determine server role 126 from the encapsulation header. Network device 108 can then decapsulate the encapsulation header to obtain packet 162 and determine service 120 by performing enhanced DPI on packet 162. Based on application policy 144, network device 108 can determine that client role 114 is allowed to receive service 120 from server role 116. Accordingly, network device 108 can forward packet 162 to client device 114. Client device 114 can then request service 120 from server 116.

Figure 2A:
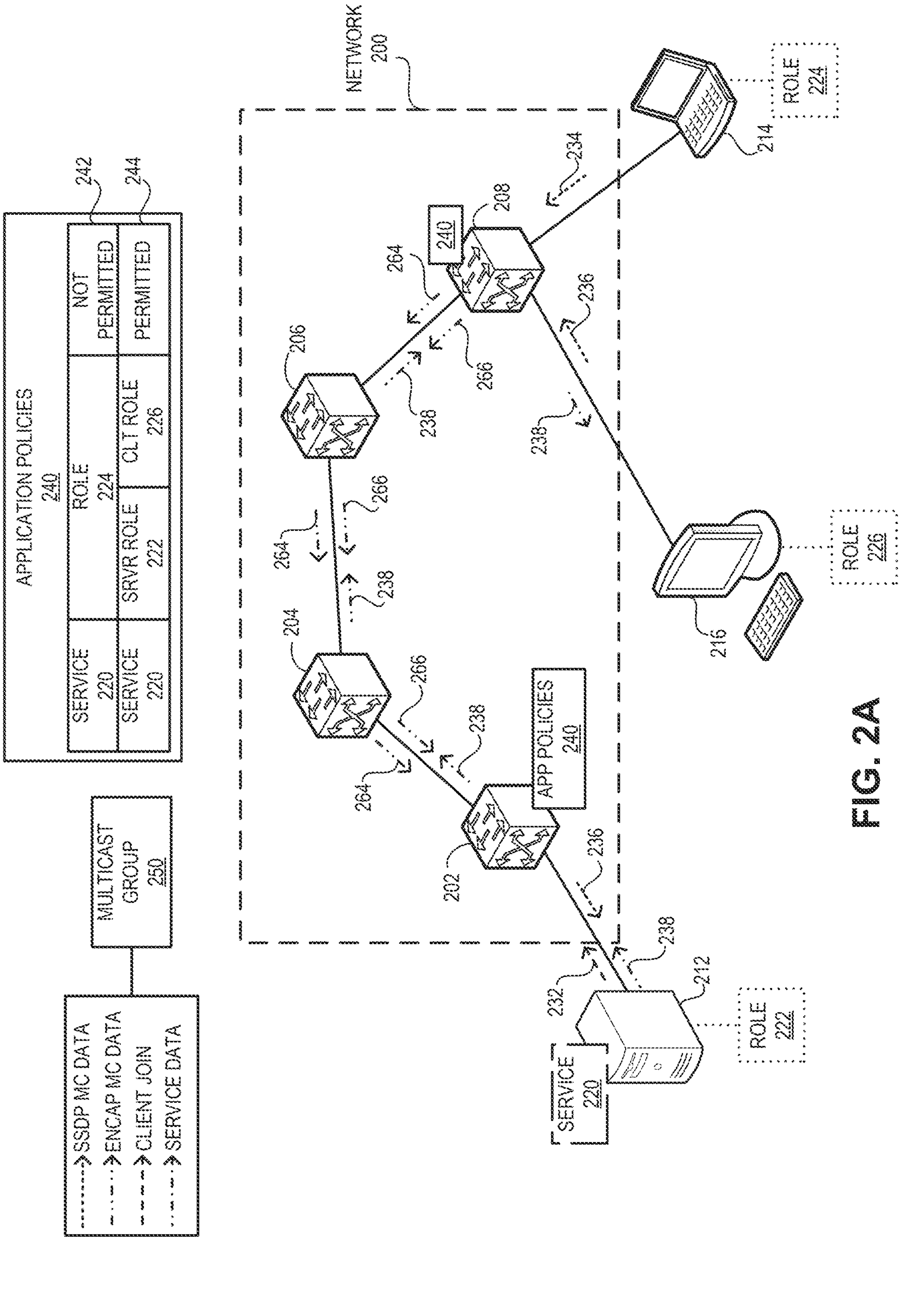
FIG. 2A illustrates an example of a server-connected network device applying application policies for service discovery, in accordance with an aspect of the present application.

FIG. 2A illustrates an example of a server-connected network device applying application policies for service discovery, in accordance with an aspect of the present application. A network 200 can include a number of network devices (e.g., switches), and may include network devices, such as layer-2 and layer-3 hops, and tunnels. In some examples, network 100 can be an Ethernet network, InfiniBand network, or other network, and may use a corresponding communication protocol, such as IP, FibreChannel over Ethernet (FCoE), or other protocols. Network 200 can include network devices 202, 204, 206, and 208. These network devices can be individual physical network devices or networking units (e.g., switching units, such as switch blades) within a chassis. A respective network device in network 200 can be assigned a MAC address and an IP address and can include at least one processing resource. Examples of a processing resource can include, but are not limited to, a processor core, a GPU, and a TPU.

To efficiently forward and manage the traffic in network 200, network devices 202, 204, 206, and 208 can facilitate role-based or group-based traffic segmentation. Typically, when user devices 212, 214, and 216 become coupled to network 200, user devices 212, 214, and 216 can become associated with corresponding roles 222, 224, and 226, respectively. Here, user device 212 can be coupled to network device 202 via a port, and user devices 214 and 216 can be coupled to network device 208 via corresponding ports. User device 212 can be a server that can facilitate a service 220. User devices 214 and 216 can run an application using which service 220 can be accessible. Therefore, user device 212 can be referred to as server 212, and user devices 214 and 216 can be referred to as client devices 214 and 216, respectively. For example, if service 220 is printing, server 212 can be a print server, and client devices 214 and 216 can use a printer driver to access service 220.

A set of application policies 240 can be deployed on network 200 to indicate which client role is allowed to receive a particular service. A respective access network device of network 200 can store application policies 240 and apply them on packets. An access network device in network 200 is a network device that can couple a user device and forward packets from the user device via network 200. In this example, network 200 can include access network devices 202 and 208. Hence, network devices 202 and 208 can store application policies 240 in respective policy data structures. The policy data structure can be stored in the forwarding hardware (e.g., in the TCAM) of a network device. When a packet is received by network device 202 or 208, it can determine a service associated with the packet, if any, and determine whether the role associated with the destination address of the packet is allowed to receive the service.

If service 220 can automatically be discovered by client device 214, server 212 and client device 214 may support UPnP and SSDP. Therefore, respective SSDP instances can run on server 212 and client device 214. To solicit service 220, the SSDP instances on client devices 214 and 216 can periodically send advertisement packets, such as packets 234 and 236, respectively. Packets 234 and 236 can be multicast packets destined to a multicast group 250 reserved for SSDP. For example, multicast group 250 can correspond to multicast IP address 239.255.255.250 associated with SSDP. The fields of packets 234 and 236 can indicate solicitation of service 120. Server 212 can send a client join request 232 (e.g., an IGMP join) for multicast group 250 to network device 202. As a result, when packets 234 and 236 are received at network device 202, network device 202 can determine that server 212 is awaiting multicast data packets of multicast group 250. Accordingly, network device 202 can forward packets 234 and 236 to server 212.

Since network device 202 determines whether to forward a solicitation packet to server 212 based on the corresponding client role, a respective solicitation packet from network device 208 can include information indicating the client role associated with the solicitation packet. Regardless of whether an application policy includes a server role, network device 208 can include the client role in the solicitation packet. For example, application policies 240 can include an application policy 242 that indicates that role 224 is not allowed to receive service 220. Application policies 240 can also include another application policy 244 that indicates that role 226 is allowed to receive service 220 from role 222. To apply either of these policies, network device 202 can rely on the client role indicated in the solicitation packets.

When network device 208 receives packet 234, network device 208 can include information indicating role 224 in packet 234. In some examples, network device 208 can encapsulate packet 234 with an encapsulation header (e.g., a VXLAN header) to generate encapsulated packet 264 and include the information in the encapsulation header of packet 264. Similarly, upon receiving packet 236, network device 208 can include information indicating role 226 in packet 236. Network device 208 can encapsulate packet 236 with an encapsulation header to generate encapsulated packet 266 and include the information in the encapsulation header of packet 266. Network device 208 can send packets 264 and 266 to network device 202 via a tunnel between network devices 202 and 208.

Network device 202 can receive packet 264 and determine role 224 from the encapsulation header. Network device 202 can then decapsulate the encapsulation header to obtain packet 234 and perform enhanced DPI on packet 234 to determine service 220 solicited by packet 234. Subsequently, network device 202 can determine whether role 224 is allowed to receive service 220 based on application policies 240. Since service 220 and role 224 match application policy 242, network device 202 can determine that role 224 is not allowed to receive service 220. Accordingly, network device 202 can block packet 234 at the port coupled to server 212. To do so, network device 202 can refrain from forwarding packet 234 via the port to server 212 and may drop packet 234. Hence, network device 202 does not forward packet 234 to server 212. Consequently, server 212 does not send data packets associated with service 220 to client device 214.

Network device 202 can also receive packet 266 and determine role 226 from the encapsulation header. Network device 202 can then decapsulate the encapsulation header to obtain packet 236 and perform enhanced DPI on packet 236 to determine service 220 solicited by packet 236. Subsequently, network device 202 can determine whether role 226 is allowed to receive service 220 based on application policies 240. Since service 220 and role 226 match application policy 242, network device 202 can determine role 222 of server 220 from a mapping between the MAC address of server 220 and role 222. The mapping can be locally stored in network device 202 (e.g., in the TCAM of network device 202). Network device 202 can then determine that role 226 is allowed to receive service 220 from role 222. Accordingly, network device 202 can forward packet 236 to server 212. Subsequently, server 212 can send packet 238, which can include service data associated with service 220, to client device 216. For example, if service 220 is video streaming, packet 238 can include information indicating frames of a video stream.

Figure 2B:
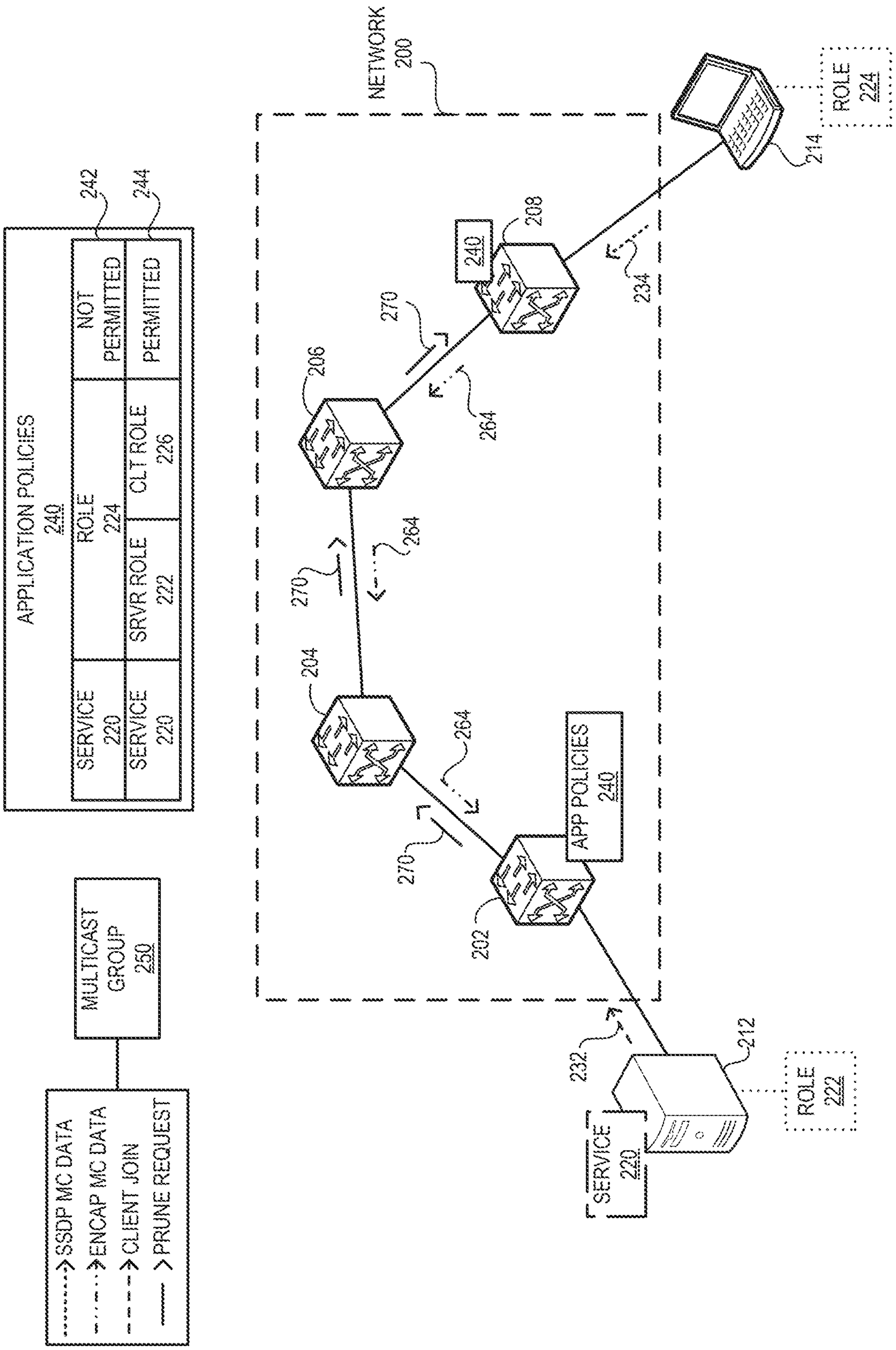
FIG. 2B illustrates an example of a server-connected network device processing a prune request associated with service discovery, in accordance with an aspect of the present application.

FIG. 2B illustrates an example of a server-connected network device processing a prune request associated with service discovery, in accordance with an aspect of the present application. In this example, network device 208 is not coupled to a client device that is allowed to receive service 220. Consequently, network device 202 may not receive service solicitation from a client device that is allowed to receive service 220. When network device 202 receives packet 234, network device 202 may not forward packet 234 to server 212 (i.e., network device 202 refrains from forwarding packet 234 to server 212), in accordance with application policy 242. Since network device 202 has not received a solicitation packet associated with a role that is allowed to receive service 220 from network device 208, network device 202 can send prune request 270 (e.g., a PIM prune request) to network device 208. Based on prune request 270, network device 208 can stop sending solicitation packets associated with 220 service to network device 202.

To trigger prune request 270, network device 202 can generate a client leave request (e.g., an IGMP leave) for server 212 and send the leave request to a local interface (i.e., to itself). For example, the leave request can be sent to the "localhost" interface of network device 202. Consequently, the PIM daemon of network device 202 can determine that there is no device awaiting multicast packets, such as solicitation packet 234, of multicast group 250. The PIM daemon can be a software entity executing on a processing resource of network device 202. The PIM daemon can execute the PIM protocol on network device 202. Hence, the PIM daemon can generate prune request 270 for multicast group 250 and send prune request 270 to network device 208. Upon receiving prune request 270, network device 208 can stop sending solicitation packets for service 220 to network device 202.

Figure 3A:
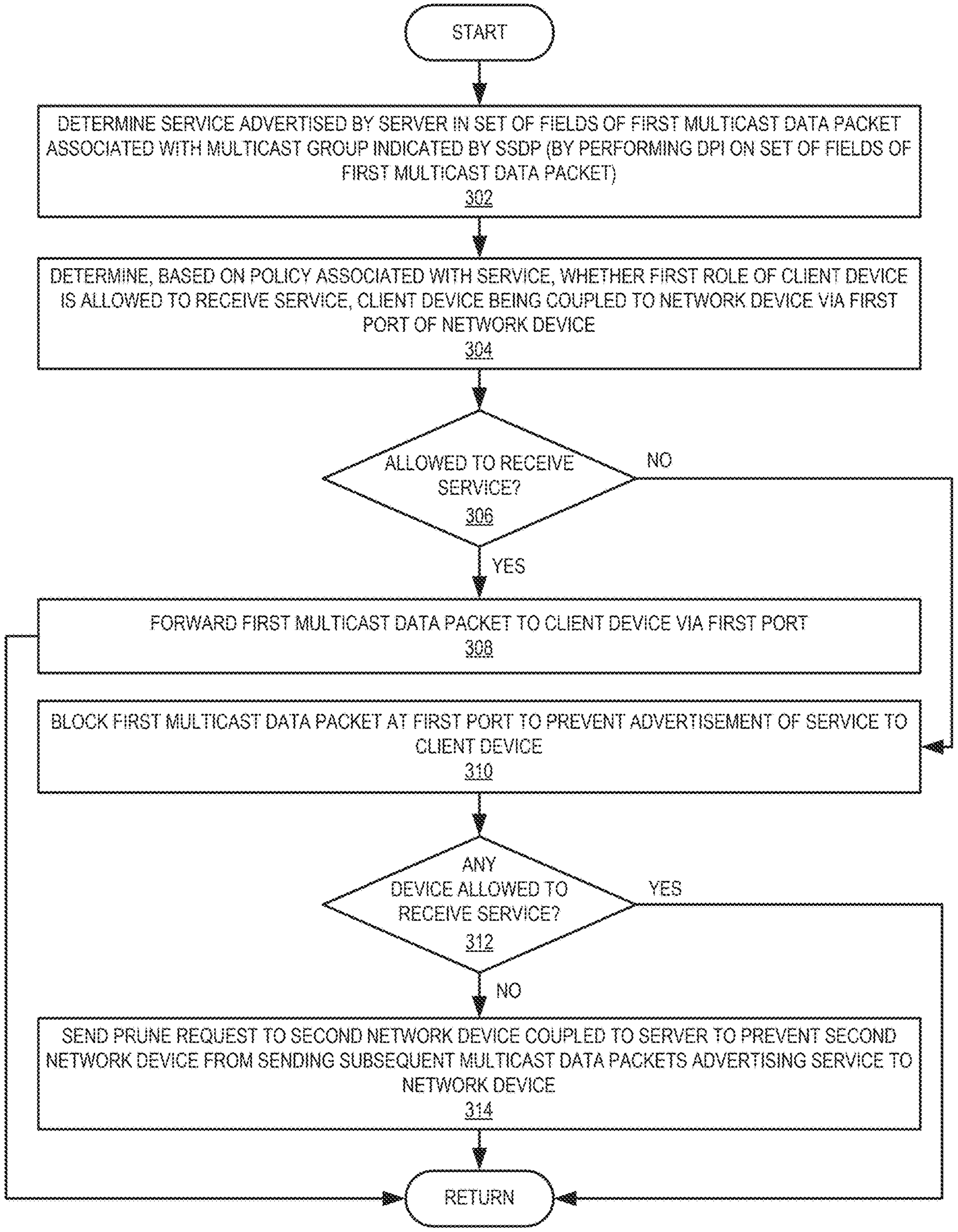
FIG. 3A presents a flowchart illustrating an example of a process of a client-connected network device applying application policies for service discovery, in accordance with an aspect of the present application.

FIG. 3A presents a flowchart illustrating an example of a process of a client-connected network device applying application policies for service discovery, in accordance with an aspect of the present application. During operation, the network device can determine a service advertised by a server in a set of fields of a first multicast data packet associated with a multicast group indicated by the SSDP (operation 302). Here, the multicast group can be reserved for SSDP. The network device can perform DPI on the set of fields of the first multicast data packet. For example, the network device can inspect the fields of the first multicast data packet and determine which service these fields correspond to. The network device can then determine, based on a policy associated with the service, whether a first role of a client device is allowed to receive the service (operation 304). The client device can be coupled to the network device via the first port of the network device. Since the client device is coupled to the network device, the network device can be an access device. Therefore, the network device can be responsible for enforcing the policy. In the example in FIG. 1A, network device 108 can perform DPI on the fields of packet 132 to determine service 120. Network device 108 can then determine, based on policy 142, whether role 124, which is the role of client device 114, is allowed to receive service 120.

If the first role is allowed to receive the service (operation 306), the network device can forward the first multicast data packet (operation 308). The first multicast data packet can be an advertisement packet that advertises the service because it is sent from the server. Since the role is allowed to receive the service, the client device should be able to discover the service and request the service from the server. Therefore, the network device can forward the first multicast data packet via the first port to the client device. In the example in FIG. 1B, network device 108 can forward packet 162 to client device 114 because role 124 is allowed to receive service 120 from server 116.

On the other hand, if the first role is not allowed to receive the service (operation 306), the network device can block the first multicast data packet at the first port to prevent the advertisement of the service to the client device (operation 308). Here, the network device can refrain from forwarding the first multicast data packet via the first port to the client device. Because the first role is not allowed to receive the service, the network device prevents advertisement of the service to the client device. As a result, the client device does not discover a service it is not allowed to access. In the example in FIG. 1A, since role 124 is not allowed to receive service 220, network device 108 does not forward packet 132 to client device 114. The network device can then determine whether any device coupled to the network device is allowed to receive the service (operation 312). The network device may be coupled to one or more client devices that are awaiting service advertisements (i.e., have sent client join requests). These client devices can be associated with one or more roles.

If none of these roles are allowed to receive the service, the network device can determine that none of the client devices are allowed to receive the service. The network device can then send a prune request to a second network device coupled to the server (operation 314). The prune request can prevent the second network device from sending subsequent multicast data packets advertising the service to the network device. Since none of the client devices coupled to the network device is allowed to receive the service, all advertisement packets of the service from the server can be blocked at the network device. By preventing the transmission of subsequent packets, the network device can reduce the bandwidth utilization of the network. In the example in FIG. 1A, network device 108 is coupled to client device 114, which is not allowed to receive service 120. Therefore, network device 108 can send prune request 138 to network device 102. As a result, network device 102 does not forward subsequent advertisement packets from server 112 to network device 108.

Figure 3B:
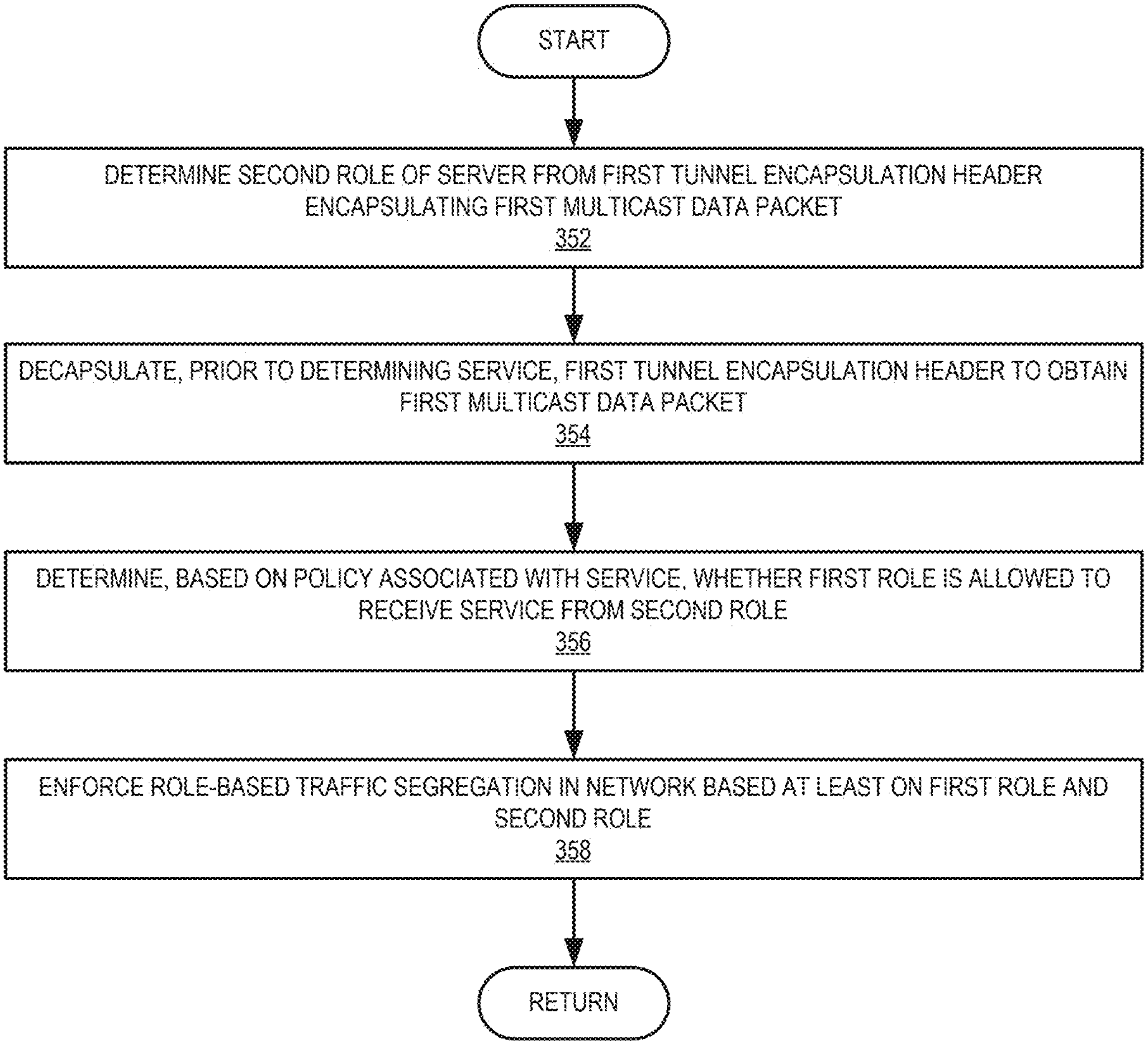
FIG. 3B presents a flowchart illustrating an example of a process of a client-connected network device applying application policies associated with server roles for service discovery, in accordance with an aspect of the present application.

FIG. 3B presents a flowchart illustrating an example of a process of a client-connected network device applying application policies associated with server roles for service discovery, in accordance with an aspect of the present application. During operation, the network device can determine a second role of the server from a first tunnel encapsulation header encapsulating the first multicast data packet (operation 352). If a policy indicates both client and server roles, the second network device coupling the server (e.g., the second network device of FIG. 3A) can encapsulate the first multicast data packet with the first tunnel encapsulation header and include the second role of the server in the encapsulation header. Upon receiving the encapsulated packet, the network device can determine the second role from the first tunnel encapsulation header.

The network device can then decapsulate, prior to determining the service, the first tunnel encapsulation header to obtain the first multicast data packet (operation 354). Since the network device can determine the service based on DPI, the network device can remove the encapsulation of the first multicast data packet, thereby decapsulating the first tunnel encapsulation header. In the example in FIG. 1B, network device 108 can obtain role 122 of sever 112 from the encapsulation header of encapsulated packet 164. Network device 108 can then decapsulate the encapsulation header and obtain packet 134. Subsequently, network device 108 can perform enhanced DPI on the fields of packet 134 and determine service 120 from packet 134.

The network device can determine, based on the policy associated with the service, whether the first role is allowed to receive the service from the second role (operation 356). Since the policy can be based on both the first role and the second role, the network device can also consider the second role (i.e., the server role). In the example in FIG. 1B, upon determining role 122 of server 112, network device 108 can determine, based on application policy 144, whether role 124 of network device 114 is allowed to receive service 120 from role 122. The network device can then enforce the role-based traffic segregation in the network based at least on the first role and the second role (operation 358). Accordingly, the network device can forward an advertisement packet based on both the first role and the second role. In the example in FIG. 1B, even though role 124 is not allowed to receive service 120 from role 122, role 124 is allowed to receive the same service 120 from role 126. Therefore, network device 108 can forward packet 162 from server 116, which is associated with role 126, to client device 114.

Figure 4:
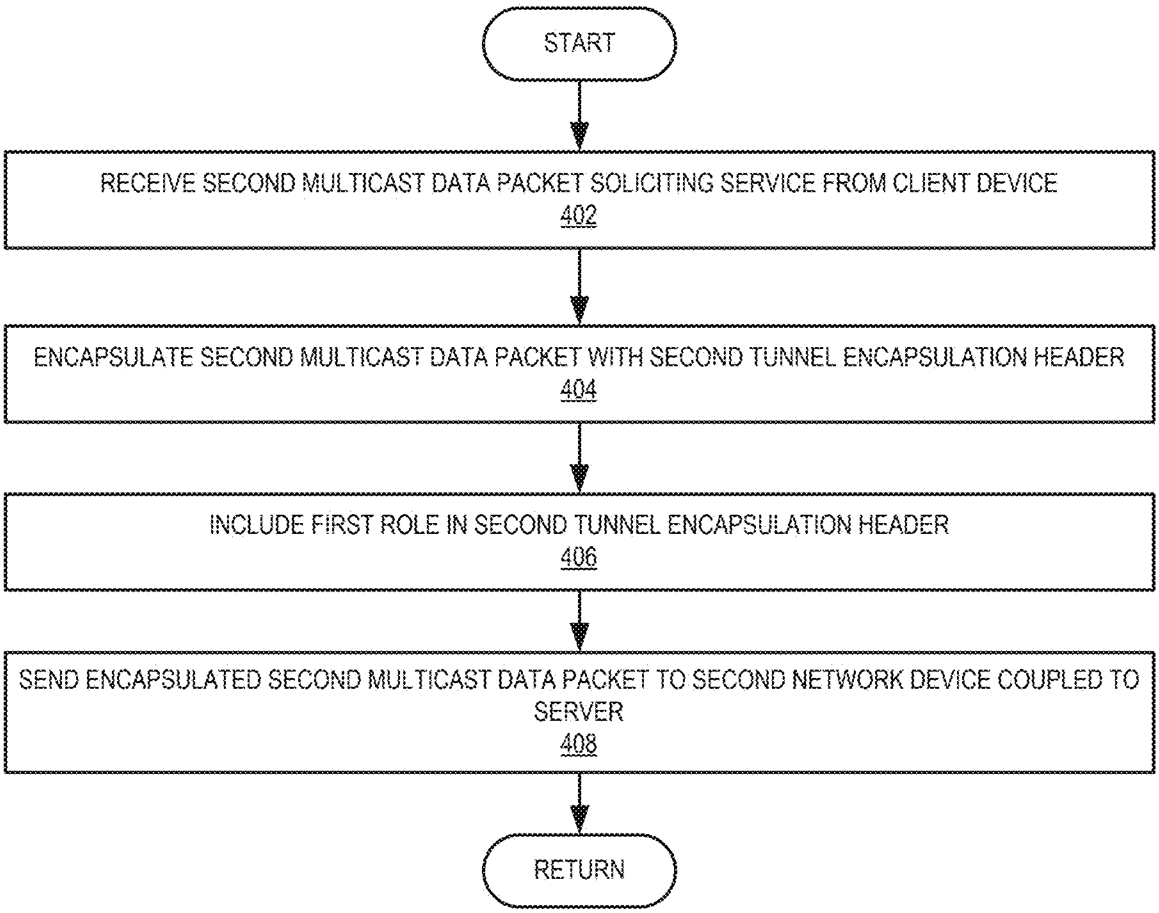
FIG. 4 presents a flowchart illustrating an example of a process of a client-connected network device sending a service solicitation to a server-connected network device, in accordance with an aspect of the present application.

FIG. 4 presents a flowchart illustrating an example of a process of a client-connected network device sending a service solicitation to a server-connected network device, in accordance with an aspect of the present application. During operation, the network device can receive a second multicast data packet soliciting the service from the client device (operation 402). Here, the network device can be coupled to the client device, as described in conjunction with FIG. 3A. To discover a service using SSDP, a server providing a service and a client device soliciting the service send advertisement and solicitation packets, respectively. Therefore, even without receiving an advertisement of the service, the client device can send the second multicast data packet, which can be a solicitation packet. In the example in FIG. 2A, network device 208 can receive packet 234, which can be a solicitation packet, from client device 214.

The network device can then encapsulate the second multicast data packet with a second tunnel encapsulation header (operation 404) and insert the first role in the second tunnel encapsulation header (operation 406). To enforce the application policies, the second network device coupled to the server (i.e., the second network device of FIG. 3A) needs to determine the client role associated with a solicitation packet. To incorporate the first role, which is associated with the client device, the network device can encapsulate the second multicast data packet with the encapsulation header and include the first role in the encapsulation header. In the example in FIG. 2A, network device 208 can encapsulate packet 234 with an encapsulation header to generate encapsulated packet 264 and include role 224 of client device 224 in the encapsulation header of packet 264.

The network device can then send the encapsulated second multicast data packet to the second network device coupled to the server (operation 408). Since the second multicast data packet is encapsulated with the second tunnel encapsulation header, the network device can send the encapsulated second multicast data packet via a corresponding tunnel. For example, if the second tunnel encapsulation header is a VXLAN header, the network device can send the encapsulated second multicast data packet via a VXLAN tunnel between the network device and the second network device. In the example in FIG. 2A, network device 208 can send encapsulated packet 264 to network device 202 via a tunnel between these two network devices.

Figure 5A:
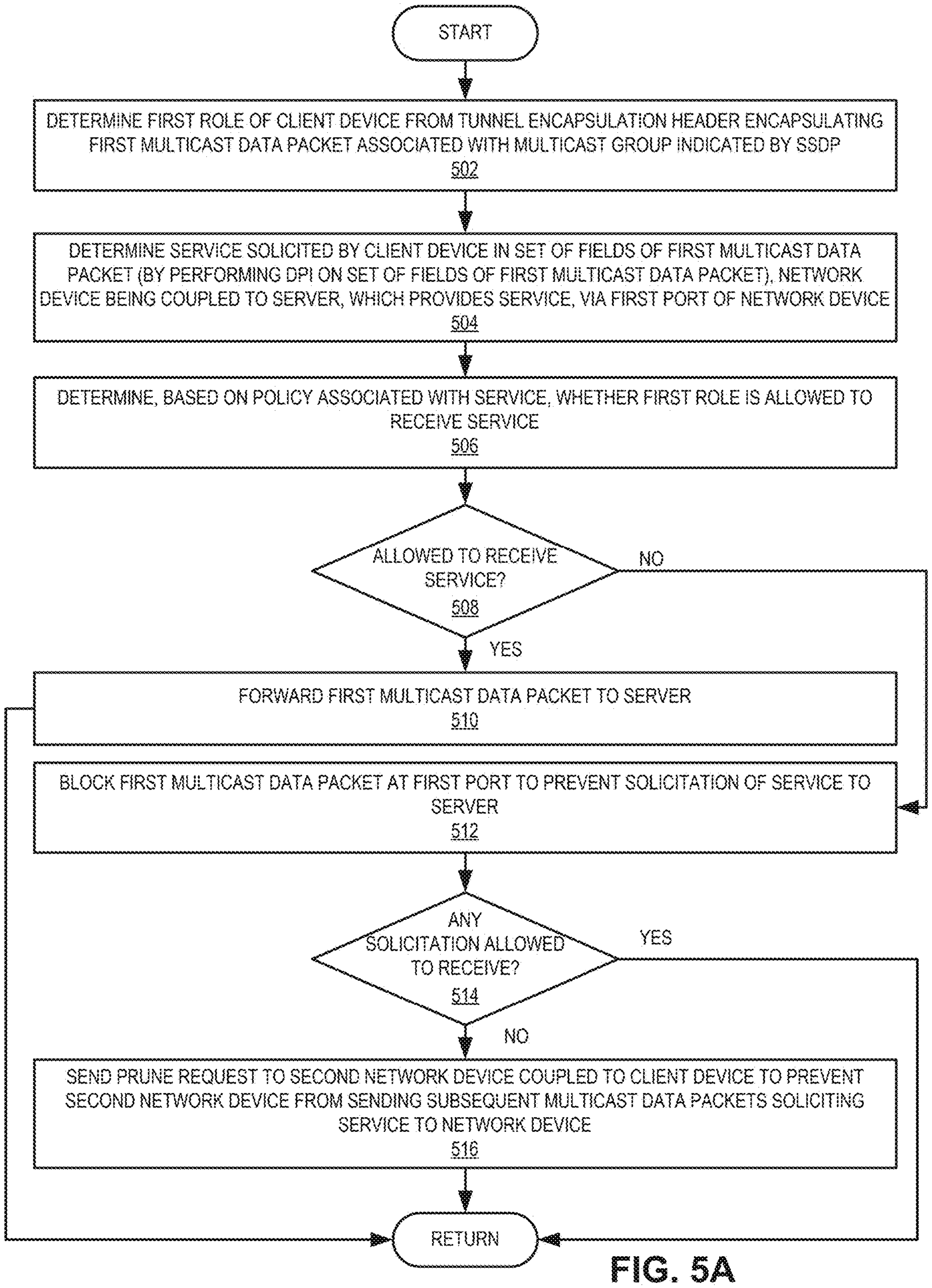
FIG. 5A presents a flowchart illustrating an example of a process of a server-connected network device applying application policies for service discovery, in accordance with an aspect of the present application.

FIG. 5A presents a flowchart illustrating an example of a process of a server-connected network device applying application policies for service discovery, in accordance with an aspect of the present application. During operation, the network device can determine a first role of a client device from a tunnel encapsulation header encapsulating the first multicast data packet (operation 502). The first multicast data packet can be associated with a multicast group indicated by SSDP (e.g., the first multicast data packet can be destined to multicast IP address 239.255.255.250). To indicate the first role, a second network device coupling the client device can encapsulate the first multicast data packet with the tunnel encapsulation header and include the first role in the encapsulation header. Upon receiving the encapsulated packet, the network device can determine the first role from the first tunnel encapsulation header. In the example in FIG. 2A, network device 202 can determine role 224 from the encapsulation header of packet 264.

The network device can then determine a service solicited by the client device in a set of fields of the first multicast data packet (operation 504). The network device can perform DPI on the set of fields of the first multicast data packet. For example, the network device can inspect the fields of the first multicast data packet and determine which service these fields correspond to. The network device can be coupled to a server, which provides the service, via the first port of the network device. Since the server is coupled to the network device, the network device can be an access device and can be responsible for enforcing an application policy. Hence, the network device can determine, based on the policy associated with the service, whether the first role is allowed to receive the service (operation 506). In the example in FIG. 2A, network device 202 can perform DPI on the fields of packet 234 to determine service 220. Network device 202 can then determine, based on policy 242, whether role 224, which is the role of client device 214, is allowed to receive service 220.

If the first role is allowed to receive the service (operation 508), the network device can forward the first multicast data packet to the server (operation 510). The first multicast data packet can be a solicitation packet that seeks the service because it is sent from the client device. In the example in FIG. 2A, network device 202 can forward packet 236 to server 212 because role 226 is allowed to receive service 220 from server 212. On the other hand, if the first role is not allowed to receive the service (operation 508), the network device can block the first multicast data packet at the first port to prevent the solicitation of the service to the server (operation 512). Here, the network device can refrain from forwarding the first multicast data packet via the first port to the server and, hence, prevents the server from receiving solicitation of the service from the first role. Because the first role is not allowed to receive the service, the network device prevents the solicitation of the service to the server. In the example in FIG. 2A, since role 224 is not allowed to receive service 220, network device 202 does not forward packet 234 to server 212.

The network device can then determine whether any solicitation received by the network device is allowed to receive the service (operation 514). The network device may receive solicitations for the service from one or more client devices via a second network device coupled to the client device. These client devices can be associated with one or more roles. If none of these roles are allowed to receive the service, the network device can determine that none of the solicitations are allowed to receive the service. The network device can then send a prune request to the second network device coupled to the server (operation 516). The prune request can prevent the second network device from sending subsequent multicast data packets soliciting the service. By preventing subsequent packets, the network device can reduce the bandwidth utilization of the network. In the example in FIG. 2B, network device 208 is coupled to client device 214, which is not allowed to receive service 220. Therefore, network device 202 can send prune request 270 to network device 208. As a result, network device 208 does not forward subsequent solicitation packets from client device 214 to network device 202.

Figure 5B:
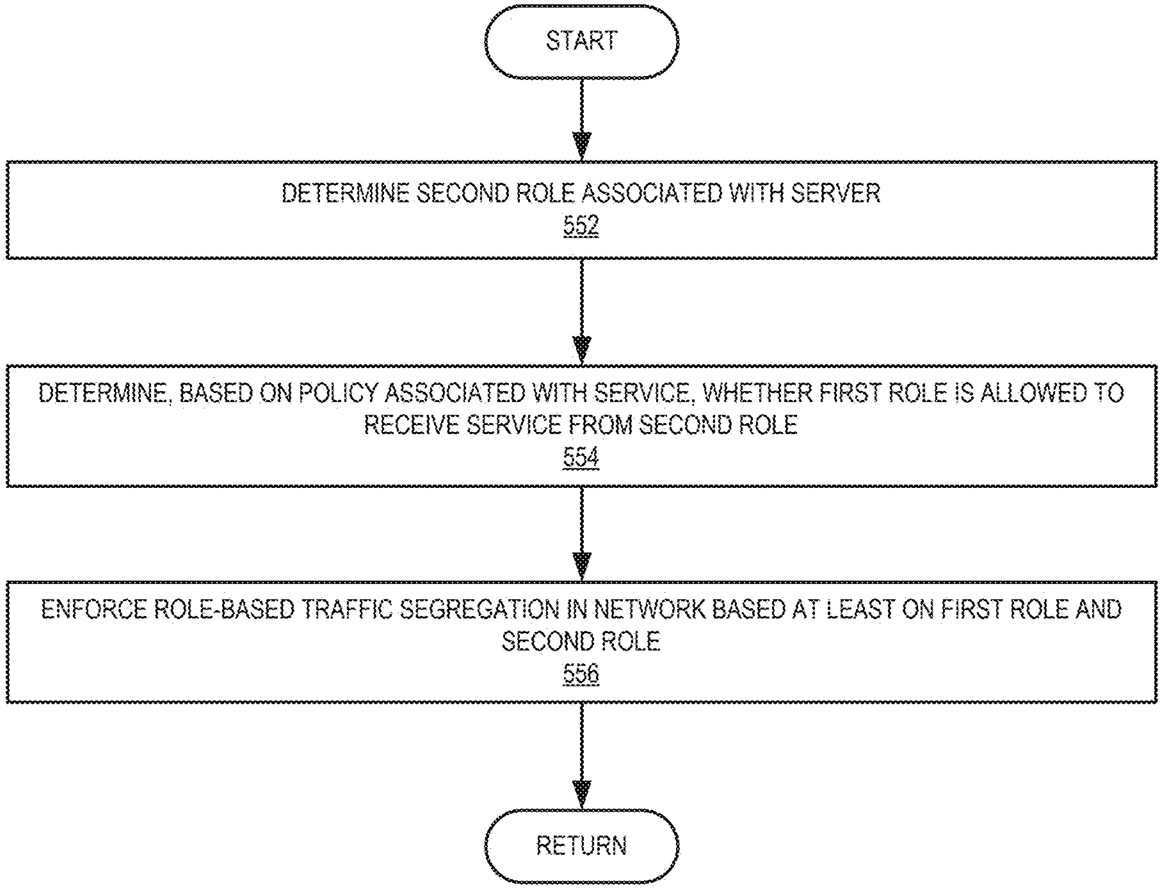
FIG. 5B presents a flowchart illustrating an example of a process of a server-connected network device applying application policies associated with server roles for service discovery, in accordance with an aspect of the present application.

FIG. 5B presents a flowchart illustrating an example of a process of a server-connected network device applying application policies associated with server roles for service discovery, in accordance with an aspect of the present application. During operation, the network device can determine a second role associated with the server (operation 552). If a policy indicates both client and server roles, the network device (e.g., the network device of FIG. 5A) can determine the role of the server. In the example in FIG. 1A, network device 202 can determine role 222 of server 212 from a local mapping stored in network device 202. The mapping can be between the MAC address of server 212 and role 222.

The network device can determine, based on the policy associated with the service, whether the first role is allowed to receive the service from the second role (operation 554). Since the policy can be based on both the first role and the second role, the network device can also consider the second role (i.e., the server role). In the example in FIG. 2A, upon determining role 222 of server 212, network device 202 can determine, based on application policy 242, whether role 224 of network device 214 is allowed to receive service 220 from role 222. The network device can then enforce the role-based traffic segregation in the network based at least on the first role and the second role (operation 556). Accordingly, the network device may or may not forward a solicitation packet based on both the first role and the second role. In the example in FIG. 2A, even though role 224 is not allowed to receive service 220 from role 222, role 226 is allowed to receive the same service 220 from role 222.

Therefore, network device 202 can forward packet 236 from client device 216, which is associated with role 226, to server 212.

Figure 6:
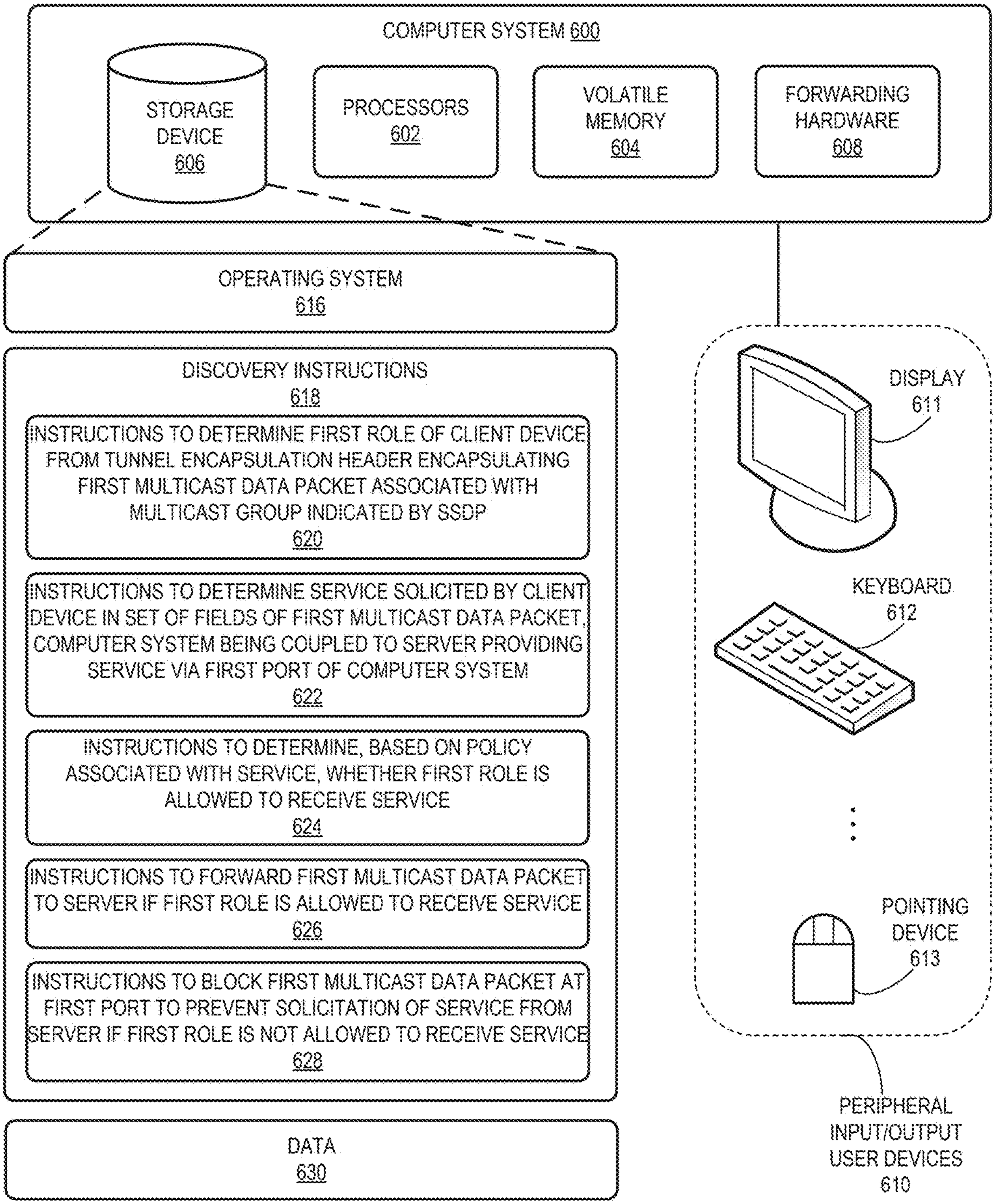
FIG. 6 illustrates an example of a computing system facilitating application policies for service discovery, in accordance with an aspect of the present application.

FIG. 6 illustrates an example of a computing system facilitating application policies for service discovery, in accordance with an aspect of the present application. Computer system 600 includes one or more processors 602, a memory 604, a storage device 606, and forwarding hardware 608. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Forwarding hardware 608 can include a TCAM. Storage device 606 includes a non-transitory computer-readable storage medium and stores an operating system 616, discovery instructions 618, and data 630. Computer system 600 may include fewer or more entities or instructions than those shown in FIG. 6.

Discovery instructions 618 can include instructions, which when executed by computer system 600, can cause computer system 600 to perform methods and/or processes described in this disclosure. Discovery instructions 618 can be executed on at least one of processors 602, forwarding hardware 608, or a combination thereof. Computer system 600 can be a network device in a distributed system, such as network devices 102 and 202 in FIGS. 1 and 2, respectively. Specifically, discovery instructions 618 may include instructions 620 to determine a first role of a client device from a tunnel encapsulation header encapsulating the first multicast data packet associated with a multicast group indicated by SSDP. Here, the first multicast data packet can be destined to multicast IP address 239.255.255.250. In the example in FIG. 2A, network device 202 can determine role 224 from the encapsulation header of packet 264. Discovery instructions 618 may also include instructions 622 to determine a service solicited by the client device in a set of fields of the first multicast data packet. Here, computer system 600 can be coupled to a server providing the service via a first port of computer system 600. In the example in FIG. 2A, network device 202, which is coupled to server 212, can determine service 220 based on the fields of packet 234.

Furthermore, discovery instructions 618 may also include instructions 624 to determine, based on the policy associated with the service, whether the first role is allowed to receive the service. In the example in FIG. 2A, network device 202 can perform DPI on the fields of packet 234 to determine service 220. Network device 202 can then determine, based on policy 242, whether role 224, which is the role of client device 214, is allowed to receive service 220. Discovery instructions 618 may include instructions 626 to forward the first multicast data packet to the server if the first role is allowed to receive the service. The first multicast data packet can be a solicitation packet that seeks the service. In the example in FIG. 2A, network device 202 can forward packet 236 to server 212 because role 226 is allowed to receive service 220 from server 212.

Moreover, discovery instructions 618 may include instructions 628 to block the first multicast data packet at the first port to prevent the solicitation of the service from the server if the first role is not allowed to receive the service. In the example in FIG. 2A, since role 224 is not allowed to receive service 220, network device 202 does not forward packet 234 to server 212. Data 630 can include any data that is required as input, or that is generated as output by the methods, operations, communications, and/or processes described in this disclosure. Specifically, data 630 can include role of a respective client device coupled to computer system 600 and a set of application policies (e.g., application policies 240 in FIG. 2A). Data 630 can also include information identifying a respective network device in a network (e.g., network 200 of FIG. 2A).

Computer system 600 and discovery instructions 618 may include more instructions than those shown in FIG. 6. For example, discovery instructions 618 can also store instructions for forwarding advertisement packet 132 to network device 108 of FIG. 1A; encapsulating packet 132 with an encapsulation header and including role of server 112 in the encapsulation header of FIG. 1B; decapsulating the encapsulation header of packet 264 to obtain packet 234 of FIG. 2A; determining whether client role 226 is allowed to receive service 220 from server role 222 of FIG. 2A; forwarding service traffic of server 212 to network device 208 of FIG. 2A; sending prune request 270 to network device 208; the operations depicted in the flowcharts of FIGS. 3, 4, and 5; and the instructions of non-transitory CRM 700 in FIG. 7.

Figure 7:
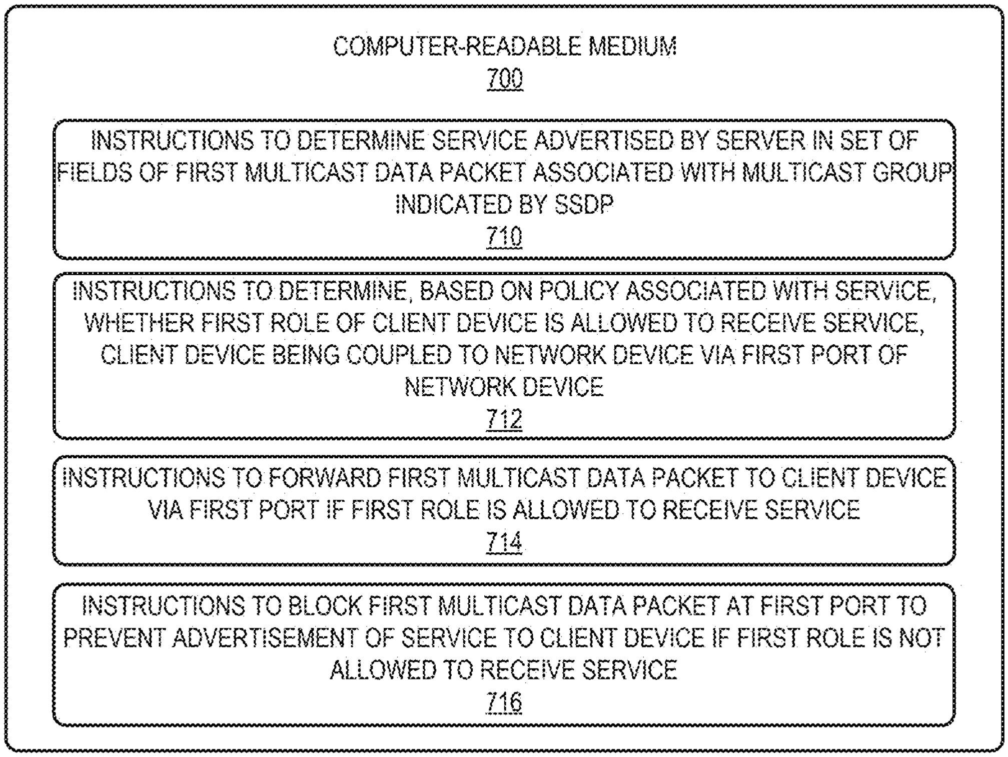
FIG. 7 illustrates an example of a computer-readable medium (CRM) facilitating application policies for service discovery, in accordance with an aspect of the present application.

FIG. 7 illustrates an example of a CRM facilitating application policies for service discovery, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to determine a service advertised by a server in a set of fields of a first multicast data packet associated with a multicast group indicated by the SSDP. In the example in FIG. 1A, network device 108 can determine service 120 based on the fields of packet 132. CRM 700 can also include instructions 712 to determine, based on a policy associated with the service, whether a first role of a client device is allowed to receive the service. The client device can be coupled to the network device via the first port of the network device. In the example in FIG. 1A, network device 108 can then determine, based on policy 142, whether role 124, which is the role of client device 114, is allowed to receive service 120.

CRM 700 can include instructions 714 to forward the first multicast data packet to the client device via the first port if the first role is allowed to receive the service. The first multicast data packet can be an advertisement packet that advertises the service because it is sent from the server. In the example in FIG. 1B, network device 108 can forward packet 162 to client device 114 because role 124 is allowed to receive service 120 from server 116. CRM 700 can also include instructions 716 to block the first multicast data packet at the first port to prevent the advertisement of the service to the client device if the first role is not allowed to receive the service. In the example in FIG. 1A, since role 124 is not allowed to receive service 120, network device 108 does not forward packet 132 to client device 114.

CRM 700 may include more instructions than those shown in FIG. 7. For example, CRM 700 can also store instructions for performing enhances DPI on packet 132 received from network device 102 of FIG. 1A; sending a prune request to network device 102 of FIG. 1A; obtaining the role of server 112 from the encapsulation header of packet 164 of FIG. 1B; decapsulating the encapsulation header of packet 164 to obtain packet 132 of FIG. 1B;

encapsulating packet 234 with an encapsulation header and including role 224 of client device 214 in the encapsulation header of FIG. 2A; sending packet 264 to network device 202 of FIG. 2B; the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a network. During operation, the network device can determine, in a set of fields of a first multicast data packet, a service advertised by a server. Here, the first multicast data packet can be associated with a multicast group indicated by a Simple Service Discovery Protocol (SSDP). The network device can determine, based on a policy associated with the service, whether the first role of a client device is allowed to receive the service. The client device can be coupled to the network device via a first port of the network device. If the first role is allowed to receive the service, the network device can forward the first multicast data packet to the client device via the first port. On the other hand, if the first role is not allowed to receive the service, the network device can block the first multicast data packet at the first port to prevent advertisement of the service to the client device.

In a variation on this aspect, the network device can perform a deep-packet inspection (DPI) on the set of fields of the first multicast data packet to determine the service.

In a variation on this aspect, if the first role is not allowed to receive the service, the network device can send a prune request to a second network device coupled to the server. The prune request can prevent the second network device from sending a subsequent multicast data packet advertising the service to the network device.

In a variation on this aspect, the network device can determine a second role of the server from a first tunnel encapsulation header encapsulating the first multicast data packet. The network device can then decapsulate, prior to determining the service, the first tunnel encapsulation header to obtain the first multicast data packet.

In a further variation, the network device can determine, based on the policy associated with the service, whether the first role is allowed to receive the service from the second role.

In a further variation, the network device can enforce role-based traffic segregation in the network based at least on the first role and the second role.

In a variation on this aspect, the network device can receive a second multicast data packet soliciting the service from the client device. Subsequently, the network device can send, to a second network device coupled to the server, the second multicast data packet.

In a further variation, the network device can encapsulate the second multicast data packet with a second tunnel encapsulation header. The network device can then include the first role in the second tunnel encapsulation header.

Another aspect of the present technology can provide a network device in a network. During operation, the network device can determine a first role of a client device from a tunnel encapsulation header encapsulating a first multicast data packet. Here, the first multicast data packet is associated with a multicast group indicated by SSDP. The network device can determine a service solicited by the client device in a set of fields of the first multicast data packet. The network device can be coupled to a server providing the service via a first port of the network device. The network device can determine, based on a policy associated with the service, whether the first role is allowed to receive the service. If the first role is allowed to receive the service, the network device can forward the first multicast data packet to the server. On the other hand, if the first role is not allowed to receive the service, the network device can block the first multicast data packet at the first port to prevent solicitation of the service from the server.

In a variation on this aspect, the network device can perform a deep-packet inspection (DPI) on the set of fields of the first multicast data packet to determine the service.

In a variation on this aspect, if the first role is not allowed to receive the service, the network device can send a prune request to a second network device coupled to the server. The prune request can prevent the second network device from sending a subsequent multicast data packet advertising the service to the network device.

In a variation on this aspect, to determine whether the first role is allowed to receive the service, the network device can determine, based on the policy associated with the service, whether the first role is allowed to receive the service from a second role associated with the server.

In a further variation, the network device can enforce role-based traffic segregation in the network based at least on the first role and the second role.

In a variation on this aspect, the network device can send, to a second network device coupled to the client device, a second multicast data packet advertising the service from the server.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

determining, by a network device, in a set of fields of a first multicast data packet, a service advertised by a server, wherein the first multicast data packet is associated with a multicast group indicated by a Simple Service Discovery Protocol (SSDP);

determining, based on a mapping between identifiers of client devices and client roles, a client role associated with a client device coupled to the network device via a port;

querying a policy data structure storing a set of policies based on a combination of the client role and the service;

determining, based on a policy matching the combination of the client role and the service, whether the client role is allowed to receive the service;

based on a determination that the client role is allowed to receive the service, forwarding the first multicast data packet to the client device via the port; and based on a determination that the client role is not allowed to receive the service, blocking the first multicast data packet at the port to prevent advertisement of the service to the client device.

2. The method of claim 1, further comprising performing a deep-packet inspection (DPI) on the set of fields of the first multicast data packet to determine the service.

3. The method of claim 1, wherein, based on a determination that the client role is not allowed to receive the service, the method further comprises sending a prune request to a second network device coupled to the server, wherein the prune request prevents the second network device from sending a subsequent multicast data packet advertising the service to the network device.

4. The method of claim 1, further comprising:

determining a server role of the server from a first tunnel encapsulation header encapsulating the first multicast data packet; and decapsulating, prior to determining the service, the first tunnel encapsulation header to obtain the first multicast data packet.

5. The method of claim 4, further comprising determining, based on the policy matching the combination of the client role and the service, whether the client role is allowed to receive the service from the server role.

6. The method of claim 4, further comprising enforcing, by the network device, role-based traffic segregation in the network based at least on the client role and the server role.

7. The method of claim 1, further comprising:

receiving a second multicast data packet soliciting the service from the client device; and sending, to a second network device coupled to the server, the second multicast data packet.

8. The method of claim 7, wherein sending the second multicast data packet further comprises:

encapsulating the second multicast data packet with a second tunnel encapsulation header; and including the client role in the second tunnel encapsulation header.

9. A method, comprising:

determining, by a network device based on a mapping between identifiers of client devices and client roles, a client role of a client device from a tunnel encapsulation header encapsulating a first multicast data packet, wherein the first multicast data packet is associated with a multicast group indicated by a Simple Service Discovery Protocol (SSDP);

determining a service solicited by the client device in a set of fields of the first multicast data packet, wherein the network device is coupled to a server providing the service via a port of the network device;

querying a policy data structure storing a set of policies based on a combination of the client role and the service;

determining, based on a policy matching the combination of the client role and the service, whether the client role is allowed to receive the service;

based on a determination that the client role is allowed to receive the service, forwarding the first multicast data packet to the server; and based on a determination that the client role is not allowed to receive the service, blocking the first multicast data packet at the port to prevent solicitation of the service from the server.

10. The method of claim 9, further comprising performing a deep-packet inspection (DPI) on the set of fields of the first multicast data packet to determine the service.

11. The method of claim 9, wherein, based on a determination that the client role is not allowed to receive the service, the method further comprises sending a prune request to a second network device coupled to the client device, wherein the prune request prevents the second network device from sending a subsequent multicast data packet soliciting the service to the network device.

12. The method of claim 9, wherein determining whether the client role is allowed to receive the service further comprises determining, based on the policy matching the combination of the client role and the service, whether the client role is allowed to receive the service from a server role associated with the server.

13. The method of claim 12, further comprising enforcing, by the network device, role-based traffic segregation in the network based at least on the client role and the server role.

14. The method of claim 9, further comprising sending, to a second network device coupled to the client device, a second multicast data packet advertising the service from the server.

15. A non-transitory computer-readable storage medium storing instructions to:

determine, by a network device, in a set of fields of a first multicast data packet, a service advertised by a server, wherein the first multicast data packet is associated with a multicast group indicated by a Simple Service Discovery Protocol (SSDP);

determine, based on a mapping between identifiers of client devices and client roles, a client role associated with a client device coupled to the network device via a port;

query a policy data structure storing a set of policies based on a combination of the client role and the service;

determine, based on a policy matching the combination of the client role and the service, whether the client role is allowed to receive the service;

based on a determination that the client role is allowed to receive the service, forward the first multicast data packet to the client device via the port; and based on a determination that the client role is not allowed to receive the service, block the first multicast data packet at the port to prevent advertisement of the service to the client device.

16. The non-transitory computer-readable storage medium of claim 15, wherein the instructions are further to perform a deep-packet inspection (DPI) on the set of fields of the first multicast data packet to determine the service.

17. The non-transitory computer-readable storage medium of claim 15, wherein, based on a determination that the client role is not allowed to receive the service, the instructions are further to send a prune request to a second network device coupled to the server, wherein the prune request prevents the second network device from sending a subsequent multicast data packet advertising the service to the network device.

18. The non-transitory computer-readable storage medium of claim 15, wherein the instructions are further to:

determine a server role of the server from a first tunnel encapsulation header encapsulating the first multicast data packet; and decapsulate, prior to determining the service, the first tunnel encapsulation header to obtain the first multicast data packet.

19. The non-transitory computer-readable storage medium of claim 18, wherein the instructions are further to determine, based on the policy matching the combination of the client role and the service, whether the client role is allowed to receive the service from the server role.

20. The non-transitory computer-readable storage medium of claim 15, wherein the instructions are further to:

encapsulate a second multicast data packet with a second tunnel encapsulation header, wherein the second multicast data packet solicits the service from the client device;

include the client role in the second tunnel encapsulation header; and send, to a second network device coupled to the server, the encapsulated second multicast data packet.

* * * * *